United States Patent
Hahnfeld et al.

(10) Patent No.: US 6,451,924 B1
(45) Date of Patent: Sep. 17, 2002

(54) HYDROGENATED BLOCK COPOLYMERS AND OPTICAL MEDIA DISCS PRODUCED THEREFROM

(75) Inventors: Jerry L. Hahnfeld; Gary D. Parsons; Stephen F. Hahn; Mary Ann Jones, all of Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/568,689

(22) Filed: May 11, 2000

Related U.S. Application Data

(60) Provisional application No. 60/139,072, filed on Jun. 11, 1999, and provisional application No. 60/184,280, filed on Feb. 23, 2000.

(51) Int. Cl.[7] ................................................. C08F 8/04
(52) U.S. Cl. .................. 525/338; 525/92 A; 525/327.8
(58) Field of Search ............................. 525/338, 92 A, 525/327.8

(56) References Cited

U.S. PATENT DOCUMENTS

| | | |
|---|---|---|
| 3,333,024 A | 7/1967 | Haefele et al. |
| 3,431,323 A | 3/1969 | Jones |
| 3,598,886 A | 8/1971 | Hoeg et al. |
| 3,644,588 A | 2/1972 | Hassell |
| 4,356,066 A | 10/1982 | Kienle et al. |
| 4,400,478 A | 8/1983 | Gergen et al. |
| 4,880,514 A | 11/1989 | Scott et al. |
| 4,882,384 A | 11/1989 | Willis et al. |
| 4,911,966 A | 3/1990 | Murayama et al. |
| 4,965,114 A | 10/1990 | Ikeda et al. |
| 5,128,388 A | 7/1992 | Komori et al. |
| 5,178,926 A | 1/1993 | Tanaka et al. |
| 5,189,110 A | 2/1993 | Ikematu et al. |
| 5,191,024 A | 3/1993 | Shibata et al. |
| 5,234,792 A | 8/1993 | Koyama et al. |
| 5,306,779 A | 4/1994 | Shibata et al. |
| 5,310,817 A | 5/1994 | Hergenrother et al. |
| 5,346,964 A | 9/1994 | Shibata et al. |
| 5,352,744 A | 10/1994 | Bates et al. |
| 5,612,422 A | 3/1997 | Hucul et al. |
| 5,635,114 A | 6/1997 | Hong |
| 5,828,043 A | 10/1998 | Nicoll et al. |
| 5,955,021 A | 9/1999 | Tiffany, III |
| 6,025,054 A | 2/2000 | Tiffany, III |
| 6,310,112 B1 * | 10/2001 | Vo et al. ...................... 521/134 |

FOREIGN PATENT DOCUMENTS

| | | |
|---|---|---|
| EP | 505110 | 9/1992 |
| EP | 892393 | 1/1999 |
| JP | 1294721 | 11/1989 |
| JP | 10116442 | 5/1998 |
| JP | 11-286526 | 10/1999 |
| WO | WO 91/05343 | 4/1991 |
| WO | WO 99/23649 | 5/1999 |
| WO | WO 99/23650 | 5/1999 |
| WO | WO 99/23652 | 5/1999 |

* cited by examiner

*Primary Examiner*—James J. Seidleck
*Assistant Examiner*—Olga Asinovsky

(57) ABSTRACT

The present invention is directed to a hydrogenated block copolymer of a vinyl aromatic and butadiene which is useful in the preparation of optical media discs having very low birefringence.

8 Claims, No Drawings

HYDROGENATED BLOCK COPOLYMERS AND OPTICAL MEDIA DISCS PRODUCED THEREFROM

This application claims the benefit of U.S. Provisional Application No. 60/139,072, filed Jun. 11, 1999 and U.S. Provisional Application No. 60/184,280, filed Feb. 23, 2000.

BACKGROUND OF THE INVENTION

This invention relates to hydrogenated block copolymers produced from vinyl aromatic and butadiene monomers.

Hydrogenated block copolymers of vinyl aromatic and butadiene monomers such as styrene-butadiene-styrene copolymers are well known in the art and disclosed in U.S. Pat. Nos. 3,333,024; 3,431,323; 3,598,886; 5,352,744; 3,644,588 and EP-505,110. Additionally, U.S. Pat. No. 4,911,966, U.S. Pat. No. 5,178,926 and JP 10-116442 disclose an optical disc substrate made from vinyl cyclohexane copolymers. However, in these applications, the copolymer can be only partially hydrogenated, producing discs having low impact and flexibility properties, low heat distortion temperature, elevated birefringence and otherwise unacceptable properties for commercial disc applications. Birefringence or double refraction is a form of optical distortion determined by the differences in the index of refraction in materials through which light passes. Birefringence affects the phase relationship of laser light, used to read optical media discs resulting in disc reading errors. In current optical media discs, high flow materials such as polycarbonate are used and the discs are molded under conditions which minimizes material stresses. However, the birefringence still approaches levels which can be problematic. The current trend in the optical disc market is directed to higher density discs which will not tolerate the levels of birefringence of the prior art.

Therefore, there remains a need for a transparent polymer and optical media discs made therefrom, having improved impact, flexibility, heat distortion temperature and very low birefringence, or otherwise acceptable properties for high density and commercial disc applications.

SUMMARY OF THE INVENTION

The first aspect of the present invention is directed to hydrogenated block copolymers and optical media discs produced therefrom. The hydrogenated block copolymer is a rigid hydrogenated block copolymer, which comprises at least two distinct blocks of hydrogenated polymerized vinyl aromatic monomer, herein referred to as hydrogenated vinyl aromatic polymer block, and at least one block of hydrogenated polymerized butadiene monomer, herein referred to as hydrogenated butadiene polymer block, wherein the hydrogenated copolymer is characterized by:

a) a weight ratio of hydrogenated butadiene polymer block to hydrogenated vinyl aromatic polymer block of 40:60 or less;

b) a total number average molecular weight ($Mn_t$) of from 30,000 to 80,000, wherein each hydrogenated vinyl aromatic polymer block (A) has a $Mn_a$ of from 10,000 to 50,000 and each hydrogenated butadiene polymer block (B) has a $Mn_b$ of from 3,000 to 30,000;

c) a hydrogenation level such that each hydrogenated vinyl aromatic polymer block has a hydrogenation level of greater than 90 percent and each hydrogenated butadiene polymer block has a hydrogenation level of greater than 95 percent; and d) a weight ratio of 1,2 to 1,4 polybutadiene content of greater than 20:80.

Hydrogenated block copolymers having these characteristics are transparent to light at visible wavelengths and are ideally suited for optical disc applications, while possessing excellent properties at both standard and elevated temperatures. The combination of transparency, high glass transition temperature, low water absorption, flexibility, excellent melt processability, and surprisingly negligible birefringence makes these materials ideal candidates for optical disc applications.

DESCRIPTION OF THE PREFERRED EMBODIMENTS

Hydrogenated block copolymers are prepared by hydrogenating a block copolymer produced from at least one vinyl aromatic monomer and at least one butadiene monomer.

The vinyl aromatic monomer is typically a monomer of the formula:

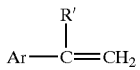

wherein R' is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono or multisubstituted with functional groups such as halo, nitro, amino, hydroxy, cyano, carbonyl and carboxyl. More preferably Ar is phenyl or alkyl phenyl with phenyl being most preferred. Typical vinyl aromatic monomers include styrene, alpha-methylstyrene, all isomers of vinyl toluene, especially paravinyltoluene, all isomers of ethyl styrene, propyl styrene, butyl styrene, vinyl biphenyl, vinyl naphthalene, vinyl anthracene and the like, and mixtures thereof. The block copolymer can contain more than one specific polymerized vinyl aromatic monomer. In other words, the block copolymer can contain a polystyrene block and a poly-alpha-methylstyrene block. The hydrogenated vinyl aromatic polymer block may also be a hydrogenated copolymer of a hydrogenated vinyl aromatic wherein the vinyl aromatic portion is at least 50 weight percent of the copolymer.

The butadiene monomer is 1,3-butadiene. Polybutadiene can contain either a 1,2 configuration, which hydrogenates to give the equivalent of a 1-butene repeat unit, or a 1,4-configuration, which hydrogenates to give the equivalent of an ethylene repeat unit. Typically, the weight ratio of 1,2 to 1,4 content of the polybutadiene block is greater than 20:80, generally greater than 25:75, preferably greater than 30:70, and more preferably greater than 35:65. A block is herein defined as a polymeric segment of a copolymer which exhibits microphase separation from a structurally or compositionally different polymeric segment of the copolymer. Microphase separation occurs due to the incompatibility of the polymeric segments within the block copolymer. The separation of block segments can be detected by the presence of distinct glass transition temperatures. Microphase separation and block copolymers are widely discussed in "Block Copolymers-Designer Soft Materials", *PHYSICS TODAY*, February, 1999, pages 32–38.

Rigid hydrogenated block copolymers are defined as having a weight ratio of hydrogenated butadiene polymer block to hydrogenated vinyl aromatic polymer block of 40:60 ore less, typically 35:65 or less, preferably less than 30:70, and more preferably less than 25:75. The total weights of the hydrogenated vinyl aromatic polymer blocks and the hydrogenated conjugated diene polymer block(s) is typically at least 80 weight percent, preferably at least 90, and more preferably at least 95 weight percent of the total weight of the hydrogenated copolymer.

The hydrogenated block copolymers of the present invention are produced by the hydrogenation of block copolymers including triblock, multiblock, tapered block, and star block copolymers such as SBS, SBSBS, and the like (wherein S is polystyrene, B is polybutadiene). The block copolymers contain at least one triblock segment comprised of a vinyl aromatic polymer block on each end, e.g. SBS. The block copolymers may, however, contain any number of additional blocks, wherein these blocks may be attached at any point to the triblock polymer backbone. Thus, linear blocks would include for example SBS, SBSB, SBSBS, SBSBSB, and the like. The copolymer can also be branched, wherein polymer chains are attached at any point along the copolymer backbone. In addition, blends of any of the aforementioned block copolymers can also be used as well as blends of the block copolymers with their hydrogenated homopolymer counterparts. In other words, a hydrogenated SBS block copolymer can be blended with a hydrogenated SBSBS block copolymer and/or a hydrogenated polystyrene homopolymer. It should be noted here that in the production of block copolymers, small amounts of residual diblock copolymers can also be produced.

The total number average molecular weight ($Mn_t$) of the hydrogenated block copolymers of the present invention is typically from 30,000, preferably from 35,000, more preferably from 45,000 and most preferably from 50,000 to 80,000, typically to 75,000, and generally to 70,000. The Mn, as referred to throughout the present specification, is determined by gel permeation chromatography. The molecular weight of the hydrogenated block copolymer and properties obtained are dependent upon the molecular weight of each of the hydrogenated polymeric blocks.

It should be noted that good properties are obtained at hydrogenated vinyl aromatic polymer block molecular weights which are lower than the entanglement molecular weight of the hydrogenated vinyl aromatic polymer. The entanglement molecular weight of a polymer is associated with the chain length required for a given polymer to show a dramatic increase in melt viscosity due to chain entanglements. The entanglement molecular weights for many common polymers have been measured and reported in *Macromolecules*, 1994, Volume 27, page 4639. It is commonly observed for glassy polymers that maximum values of strength and toughness are achieved at about 10 times the entanglement molecular weight (see, for instance, Styrene Polymers in the *Encyclopedia of Polymer Science and Engineering*, 2nd edition, Volume 16, pages 62–71, 1989). The entanglement molecular weight is approximately 38,000 for hydrogenated polystyrene (polyvinylcyclohexane). We have determined that an optimum balance of properties and processability can be obtained at hydrogenated vinyl aromatic polymer block molecular weights ($Mn_a$) of 0.2 to 1.2 times the entanglement molecular weight of a hydrogenated vinyl aromatic polymer.

The $Mn_a$ of the hydrogenated vinyl aromatic polymer block will typically be from 10,000, preferably from 12,000, more preferably from 15,000 to 50,000, preferably to 45,000, more preferably to 40,000 and most preferably to 30,000. The hydrogenated butadiene polymer block will typically have a $Mn_b$ of from 3,000, preferably from 4,000, to 30,000, preferably to 25,000, and most preferably to 20,000.

It is important to note that each individual block of the hydrogenated block copolymer of the present invention, can have its own distinct Mn. In other words, for example, two hydrogenated vinyl aromatic polymer blocks within the hydrogenated block copolymer may each have a different Mn.

Methods of making block copolymers are well known in the art. Typically, block copolymers are made by anionic polymerization, examples of which are cited in *Anionic Polymerization: Principles and Practical Applications*, H. L. Hsieh and R. P. Quirk, Marcel Dekker, New York, 1996. In one embodiment, block copolymers are made by sequential monomer addition to a carbanionic initiator such as sec-butyl lithium or n-butyl lithium. In another embodiment, the copolymer is made by coupling a triblock material with a divalent coupling agent such as 1,2-dibromoethane, dichlorodimethylsilane, or phenylbenzoate. In this embodiment, a small chain (less than 10 monomer repeat units) of a butadiene polymer can be reacted with the vinyl aromatic polymer coupling end to facilitate the coupling reaction. Vinyl aromatic polymer blocks are typically difficult to couple, therefore, this technique is commonly used to achieve coupling of the vinyl aromatic polymer ends. The small chain of diene polymer does not constitute a distinct block since no microphase separation is achieved. Coupling reagents and strategies which have been demonstrated for a variety of anionic polymerizations are discussed in Hsieh and Quirk, Chapter 12, pgs. 307–331. In another embodiment, a difunctional anionic initiator is used to initiate the polymerization from the center of the block system, wherein subsequent monomer additions add equally to both ends of the growing polymer chain. An example of a such a difunctional initiator is 1,3-bis(1-phenylethenyl) benzene treated with organolithium compounds, as described in U.S. Pat. Nos. 4,200,718 and 4,196,154, which are herein incorporated by reference.

After preparation of the block copolymer, the copolymer is hydrogenated to remove sites of unsaturation in both the butadiene polymer block and the vinyl aromatic polymer block segments of the copolymer. Any method of hydrogenation can be used and such methods typically include the use of metal catalysts supported on an inorganic substrate, such as Pd on $BaSO_4$ (U.S. Pat. No. 5,352,744) and Ni on kieselguhr (U.S. Pat. No. 3,333,024) both of which are incorporated herein by reference. Additionally, soluble, homogeneous catalysts such those prepared from combinations of transition metal salts of 2-ethylhexanoic acid and alkyl lithiums can be used to fully saturate block copolymers, as described in *Die Makromolekulare Chemie*, Volume 160, pp. 291, 1972. The copolymer hydrogenation can also be achieved using hydrogen and a heterogeneous catalyst such as those described in U.S. Pat. No. 5,352,744, U.S. Pat. No. 5,612422 and U.S. Pat. No. 5,645,253 which are herein incorporated by reference. The catalysts described therein are heterogeneous catalysts consisting of a metal crystallite supported on a porous silica substrate. An example of a silica supported catalyst which is especially useful in the polymer hydrogenation is a silica which has a surface area of at least 10 $m^2/g$ which is synthesized such that is contains pores with diameters ranging between 3000 and 6000 angstroms. This silica is then impregnated with a metal capable of catalyzing hydrogenation of the polymer, such as nickel, cobalt, rhodium, ruthenium, palladium, platinum, other Group VIII metals, combinations or alloys thereof. Other heterogeneous catalysts can also be used, having average pore diameters in the range of 500 to 3,000 angstroms.

Alternatively, the hydrogenation can be conducted in the presence of a mixed hydrogenation catalyst characterized in that it comprises a mixture of at least two components. The first component comprises any metal which will increase the rate of hydrogenation and includes nickel, cobalt, rhodium, ruthenium, palladium, platinum, other Group VIII metals, or combinations thereof. Preferably rhodium and/or platinum is used. However, platinum is known to be a poor hydrogenation catalyst for nitriles, therefore, platinum would not be preferred in the hydrogenation of nitrile copolymers. The second component used in the mixed hydrogenation catalyst comprises a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of the deactivation resistant component in the mixed catalyst is at least an amount which significantly inhibits the deactivation of the Group VIII metal component when exposed to polar impurities within a polymer composition, herein referred to as a deactivation inhibiting amount. Deactivation of the Group VIII metal is evidenced by a significant decrease in hydrogenation reaction rate. This is exemplified in comparisons of a mixed hydrogenation catalyst and a catalyst containing only a Group VIII metal component under identical conditions in the presence of a polar impurity, wherein the catalyst containing only a Group VIII metal component exhibits a hydrogenation reaction rate which is less than 75 percent of the rate achieved with the mixed hydrogenation catalyst.

Preferably, the amount of deactivation resistant component is such that the ratio of the Group VIII metal component to the deactivation resistant component is from 0.5:1 to 10:1, more preferably from 1:1 to 7:1, and most preferably from 1:1 to 5:1.

The mixed catalyst can consist of the components alone, but preferably the catalyst additionally comprises a support on which the components are deposited. In one embodiment, the metals are deposited on a support such as a silica, alumina or carbon. In a more specific embodiment, a silica support having a narrow pore size distribution and surface area greater than 10 meters squared per gram (m2/g) is used.

The pore size distribution, pore volume, and average pore diameter of the support can be obtained via mercury porosimetry following the proceedings of ASTM D-4284-83.

The pore size distribution is typically measured using mercury porosimetry. However, this method is only sufficient for measuring pores of greater than 60 angstroms. Therefore, an additional method must be used to measure pores less than 60 angstroms. One such method is nitrogen desorption according to ASTM D-4641-87 for pore diameters of less than about 600 angstroms. Therefore, narrow pore size distribution is defined as the requirement that at least 98 percent of the pore volume is defined by pores having pore diameters greater than 300 angstroms and that the pore volume measured by nitrogen desorption for pores less than 300 angstroms, be less than 2 percent of the total pore volume measured by mercury porosimetry.

The surface area can be measured according to ASTM D-3663-84. The surface area is typically between 10 and 100 $m^2/g$, preferably between 15 and 90 with most preferably between 50 and 85 $m^2/g$.

The desired average pore diameter of the support for the mixed catalyst is dependent upon the polymer which is to be hydrogenated and its molecular weight (Mn). It is preferable to use supports having higher average pore diameters for the hydrogenation of polymers having higher molecular weights to obtain the desired amount of hydrogenation. For high molecular weight polymers (Mn>200,000 for example), the typical desired surface area can vary from 15 to 25 $m^2/g$ and the desired average pore diameter from 3,000 to 4000 angstroms. For lower molecular weight polymers (Mn<100,000 for example), the typical desired surface area can vary from 45 to 85 $m^2/g$ and the desired average pore diameter from 300 to 700 angstroms.

Silica supports are preferred and can be made by combining potassium silicate in water with a gelation agent, such as formamide, polymerizing and leaching as exemplified in U.S. Pat. No. 4,112,032. The silica is then hydrothermally calcined as in Iler, R. K., *The Chemistry of Silica*, John Wiley and Sons, 1979, pp. 539–544, which generally consists of heating the silica while passing a gas saturated with water over the silica for about 2 hours or more at temperatures from about 600° C. to about 850° C. Hydrothermal calcining results in a narrowing of the pore diameter distribution as well as increasing the average pore diameter. Alternatively, the support can be prepared by processes disclosed in Iler, R. K., *The Chemistry of Silica*, John Wiley and Sons, 1979, pp. 510–581.

A silica supported catalyst can be made using the process described in U.S. Pat. No. 5,110,779, which is incorporated herein by reference. An appropriate metal, metal component, metal containing compound or mixtures thereof, can be deposited on the support by vapor phase deposition, aqueous or nonaqueous impregnation followed by calcination, sublimation or any other conventional method, such as those exemplified in *Studies in Surface Science and Catalysis*, "Successful Design of Catalysts" V. 44, pg. 146–158, 1989 and *Applied Heterogeneous Catalysis* pgs. 75–123, Institute Français du Pétrole Publications, 1987. In methods of impregnation, the appropriate metal containing compound can be any compound containing a metal, as previously described, which will produce a usable hydrogenation catalyst which is resistant to deactivation. These compounds can be salts, coordination complexes, organometallic compounds or covalent complexes.

Typically, the total metal content of the mixed supported catalyst is from 0.1 to 10 wt. percent based on the total weight of the silica supported catalyst. Preferable amounts are from 2 to 8 wt. percent, more preferably 0.5 to 5 wt. percent based on total catalyst weight.

Promoters, such as alkali, alkali earth or lanthanide containing compounds, can also be used to aid in the dispersion of the metal component onto the silica support or stabilization during the reaction, though their use is not preferred.

The amount of mixed supported catalyst used in the hydrogenation process is much smaller than the amount required in conventional unsaturated polymer hydrogenation reactions due to the high reactivity of the hydrogenation catalysts. Generally, amounts of less than 1 gram of supported catalyst per gram of unsaturated polymer are used, with less than 0.1 gram being preferred and less than 0.05 being more preferred. The amount of supported catalyst used is dependent upon the type of process, whether it is continuous, semi-continuous or batch, and the process conditions, such as temperature, pressure and reaction time wherein typical reaction times may vary from about 5 minutes to about 5 hours. Continuous operations can typically contain 1 part by weight supported catalyst to 200,000 or more parts unsaturated polymer, since the supported catalyst is reused many times during the course of continuous operation. Typical batch processes can use 1 part by weight supported catalyst to 5,000 parts unsaturated polymer. Higher temperatures and pressures will also enable using smaller amounts of supported catalyst.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as cyclohexane, methylcyclohexane, ethylcyclohexane, cyclooctane, cycloheptane, dodecane, dioxane, diethylene glycol dimethyl ether, tetrahydrofuran, isopentane, decahydronaphthalene or mixtures thereof, with cyclohexane being the most preferred.

The temperature at which the hydrogenation is conducted can be any temperature at which hydrogenation occurs without significant degradation of the polymer. Degradation of the polymer can be detected by a decrease in Mn, an increase in polydispersity or a decrease in glass transition temperature, after hydrogenation. Significant degradation in polymers having a polydispersity between 1.0 and about 1.2 can be defined as an increase of 30 percent or more in polydispersity after hydrogenation. Preferably, polymer degradation is such that less than a 20 percent increase in polydispersity occurs after hydrogenation, most preferably less than 10 percent. In polymers having polydispersity greater than about 1.2, a significant decrease in molecular weight after hydrogenation indicates that degradation has occurred. Significant degradation in this case is defined as a decrease in Mn of 20 percent or more. Preferably, a Mn decrease after hydrogenation will be less than 10 percent. However, polymers such as poly-alpha-methylstyrene or other alpha substituted vinyl aromatic polymers which are more prone to polymer degradation, can tolerate a decrease in Mn of up to 30 percent.

Typical hydrogenation temperatures are from about 40° C. preferably from about 100° C., more preferably from about 110° C., and most preferably from about 120° C. to about 250° C., preferably to about 200° C., more preferably to about 180° C., and most preferably to about 170° C.

The pressure of the hydrogenation reaction is not critical, though hydrogenation rates increase with increasing pressure. Typical pressures range from atmospheric pressure to 70 MPa, with 0.7 to 10.3 MPa being preferred.

The hydrogenation reaction vessel is purged with an inert gas to remove oxygen from the reaction area. Inert gases include but are not limited to nitrogen, helium, and argon, with nitrogen being preferred.

The hydrogenating agent can be any hydrogen producing compound which will efficiently hydrogenate the unsaturated polymer. Hydrogenating agents include, but are not limited, to hydrogen gas, hydrazine and sodium borohydride. In a preferred embodiment, the hydrogenating agent is hydrogen gas.

The level of hydrogenation of the block copolymer of the present invention is generally greater than 95 percent of the butadiene polymer block and greater than 90 percent of the vinyl aromatic polymer block segments, typically greater than 99 percent of the butadiene polymer block and greater than 95 percent of the vinyl aromatic polymer block segments, preferably greater than 99.5 percent of the butadiene polymer block and greater than 97 percent of the vinyl aromatic polymer block segments, more preferably greater than 99.9 percent of the butadiene polymer block and 98.5 percent of the vinyl aromatic polymer block segments, even more preferably greater than 99 percent of the vinyl aromatic polymer segments. The term 'level of hydrogenation' refers to the percentage of the original unsaturated bonds which become saturated upon hydrogenation. The level of hydrogenation for the hydrogenated vinyl aromatic polymer block is determined by UV-VIS spectrophotometry, while the level of hydrogenation of the hydrogenated butadiene polymer block is determined by proton NMR.

The hydrogenated block copolymers of the present invention are useful in the production of optical media storage devices such as discs, flash memory cards, integrated circuit cards, smart cards, and other media or information-carrying substrates.

In particular, the hydrogenated block copolymers of the present invention are useful in the production of optical storage media devices and components thereof. Optical storage media components include a transparent substrate, a protective layer, a protective case, or an information layer, any of which can comprise the hydrogenated block copolymers of the present invention. Examples of storage media formats which use these devices include prerecorded, recordable and rewriteable versions of CD and DVD formats, optical recording mediums such as those disclosed in U.S. Pat. No. 4,965,114 and U.S. Pat. No. 5,234,792, incorporated herein by reference, all of which are well known in the art and discussed in *The Compact Disc Handbook* $2^{nd}$ nd Edition by Pohlmann.

The hydrogenated block copolymers of the present invention can be used to produce the information carrying transparent substrates for both CD (compact disc) and DVD (digital versatile disc) prerecorded formats as, for example, disclosed in U.S. Pat. No. 5,635,114, incorporated herein by reference. In the case of the CD format the transparent substrate is coated with a reflective metal layer, e.g. aluminum, followed by a protective coating, e.g. a U.V. curable lacquer. The DVD structure includes two information carrying substrates, e.g. comprising the hydrogenated block copolymers of the present invention, which are sputtered with an aluminum reflective layers, or gold or silicon semi-reflective layers. The individual substrates are bonded together to form a dual layer disc with an overall thickness equal to the thickness of a CD media device. In order to produce high density pre-recorded DVD formats, stampers are inserted into the mold with track pitch of 0.4 to 0.5 in order to achieve data density of 10 to 20 Gb. High density developmental formats can also use a data carrying thin film layer which is supported by a non-data containing substrate layer in which case either or both media layers can be produced from the hydrogenated block copolymers of the present invention.

Hydrogenated block copolymers of the present invention are also useful for the production of substrates with a wobbled spiral groove for recordable optical disc formats. The substrate is typically coated with a light absorbing dye layer and then a reflective layer. Examples of reflective layers include gold or silver. During the recording process the dye absorbs heat from the laser beam recorder. The substrate, dye and reflective layer composite structure is deformed by the heat which forms a permanent pit. Signal strength is enhanced by optical change in the dye. Dual layer DVD style media differs from CD format in that two groove containing substrates are bonded together to form a single optical storage device with information stored on two layers.

In a specific embodiment, one aspect of the present invention is a pre-recorded or recordable optical media disc comprising:

(a') a first substrate layer;
(b') an optional first photosensitive dye layer;
(c') at least one group of the following two reflective or semi-reflective sublayers:
    (i') a first sublayer comprising a metal, an inorganic carbide, or an inorganic nitride;

(ii') a second sublayer comprising a protective or adhesive composition;

(d') an optional second metal/inorganic layer comprising a metal, an inorganic carbide, or an inorganic nitride;

(e') an optional second photosensitive dye layer;

(f') an optional second substrate layer;

wherein at least one of the first substrate layer or optional second substrate layer comprises the hydrogenated block copolymer composition of the present invention.

Suitable photosensitive dye layers include photosensitive nitrogen-containing compounds, such as cyanine, phthalocyanine, and azo-compounds. Typically, the photosensitive dye layer will be at least 1 microns, preferably at least 10 microns; typically no more than 100 microns, preferably no more than 75 microns.

Suitable reflective or semi-reflective metal layers and sublayers include elemental aluminum, silver, or gold. Other suitable reflective or semi-reflective sublayers include silicon compounds such as silicon nitride and silicon carbide. Typically, the reflective or semi-reflective layer or sublayer will be at least 5 nm, preferably at least 10 nm; typically no more than 100 nm, preferably no more than 30 nm in thickness. The metal layer may be applied by cathode sputtering techniques well-known in the art.

Suitable protective compositions include, for example, photocured acrylates (such as polymethylmethacrylate, epoxy acrylates). Such lacquers will include a photoinitiator, such as to result in, e.g., radical curing or cationic UV curing of the lacquer.

Suitable adhesive compositions include hot melt or solvent based adhesives. Such adhesives will typically comprise a polymeric component (e.g., polyethylene, styrene block copolymers (including block copolymers having been hydrogenated along the backbone, such as SBS, SEBS, SPS, SEPS, and SIS), amorphous polyolefins, etc.), in conjunction with one or more additional components selected from the group consisting of waxes, tackifiers, plasticizers, and fillers. The polymeric component may be optionally functionalized, such as to promote adhesion between the adjacent components.

In a specific embodiment, the hydrogenated block copolymers of the present invention are used to produce pre-recorded audio compact discs (CD-audio). Specifications for a compact disc system are well known in the art and disclosed in *The Compact Disc Handbook*, $2^{nd}$ Edition, Pohlmann, pg. 49. The disc diameter is 120 millimeters (mm), the hole diameter is 15 mm and the thickness is 1.2 mm. Data is recorded on an area 35.5 mm wide. The CD substrate comprises the hydrogenated block copolymers of the present invention and is transparent. Data is physically contained in pits which are impressed along its top surface and are covered with a very thin (50 to 100 nanometers) metal such as aluminum, silver or gold. Another thin plastic layer of 10 to 30 micrometers protects the metallized pit surface, on top of which the identifying label is printed.

A specific embodiment of the present invention is a pre-recorded CD comprising:

(a1) a substrate layer;

(b1) a metal layer, wherein the metal is preferably selected from the group consisting of aluminum, silver, or gold; and (c1) a lacquer layer;

wherein the substrate comprises the composition of the first aspect of the present invention.

In another specific embodiment, the optical media disc will be a CD-R (recordable), comprising:

(a2) a substrate;

(b2) a photosensitive dye layer;

(c2) a reflective or semi-reflective metal layer; and (d2) a lacquer.

The substrate, dye layer, metal and lacquer are as described previously.

In another specific embodiment, the optical media disc can be a DVD such as a DVD-5 disk, comprising:

(a3) a first substrate layer;

(b3) a metal layer, preferably selected from the group consisting of gold and silver;

(c3) a lacquer layer; and (d3) a second substrate layer, wherein at least one of the first substrate layer or second substrate layer comprises a hydrogenated block copolymer of the present invention.

In another embodiment, the optical media disc will be a DVD-9 disk, comprising:

(a4) a first substrate layer;

(b4) an inorganic carbide or inorganic nitride layer, preferably selected from the group consisting of silica carbide and silica nitride, or alternatively a gold layer;

(c4) a lacquer layer;

(d4) a metal layer, typically aluminum or alloy thereof; and (e4) a second substrate layer, wherein at least one of the first substrate layer or second substrate layer comprises a hydrogenated block copolymer of the present invention.

In another embodiment, the optical media disc will be a DVD-14 disc, comprising:

(a5) a first substrate layer;

(b5) an inorganic carbide or inorganic nitride layer, preferably selected from the group consisting of silica carbide and silica nitride, or alternatively a gold layer;

(c5) a lacquer layer;

(d5) at least one group of the following two sublayers:

(i5) a first sublayer comprising a metal, an inorganic carbide, or an inorganic nitride, preferably a metal in each instance, more preferably aluminum or gold in each instance;

(ii5) a second sublayer comprising a protective lacquer or an adhesive composition;

(e5) a second substrate layer;

wherein at least one of the first substrate layer and the second substrate layer comprises a hydrogenated block copolymer of the present invention.

In another embodiment, the optical media disc will be a DVD-18 disc, comprising:

(a6) a first substrate layer;

(b6) a first inorganic carbide or inorganic nitride layer, preferably selected from the group consisting of silica carbide and silica nitride, or alternatively a gold layer;

(c6) a lacquer layer;

(d6) at least two groups of the following two sublayers:

(i6) a first sublayer comprising a metal, an inorganic carbide, or an inorganic nitride, preferably a metal in each instance, more preferably aluminum or gold in each instance;

(ii6) a second sublayer comprising a protective lacquer or an adhesive composition;

(e6) a second inorganic carbide or inorganic nitride layer, preferably selected from the group consisting of silica carbide and silica nitride; and (f6) a second substrate layer;

wherein at least one of the first substrate layer and the second substrate layer comprises a hydrogenated block copolymer of the present invention.

Metal layers, lacquers and inorganics recited herein, are as previously described herein.

The hydrogenated block copolymers of the present invention can also be used in other CD formats including CD-ROM, CD-I, DVI, CD-V, CD+G/M, mini-discs and CD-3. CD-ROM (Read Only Memory) incorporates nonaudio data, such as data base and software data. CD-I (Interactive) and DVI are specific applications of CD-ROM, wherein data storage includes audio-visual information stored in a user-interactive manner. DVI (Digital Video Interactive) is an all digital optical disc format capable of reproducing full-motion, full-screen video, computer-generated video graphics and digital audio via a CD-ROM drive. CD-V is a combination of audio and video technology which merges the audio with Laservision video format. Other CD formats which can be produced from the composition of the present invention include CD+G/M (Graphics) which is a storage disc for graphics and other nonmusical data. This format takes advantage of the nonaudio data area, wherein still color images, text or other material is stored on an audio compact disc and displayed on a television monitor while the music plays. Another format is CD-3 which is used for applications requiring shorter playing time. The data format is identical to the regular 12 cm diameter CD, but its diameter is only 8 cm and can additionally be used for CD-ROM applications. Photo CD's and CDTV may also be produced from the composition of the present invention. CDTV, which is similar to CD-I, employs the compact disc standard as a basis for multimedia presentations of audio and video including images, graphics, text and animation.

Hydrogenated block copolymers of the present invention can also be used as the transparent substrate and/or the protective layer of a rewritable/erasable disc having one or more layers. In this case the recording layer is sandwiched between a transparent substrate, e.g. comprising the hydrogenated block copolymer of the present invention, and a protective layer. The recording layer is typically approximately 50 nm thick. Recording layers include magneto-optical and phase-change layers. For magneto-optical formats several magnetic materials can be used for recording layers including rare-earth transition metals such as gadolinium terbium iron, terbium iron cobalt, and terbium iron.

In one embodiment, the rewritable/erasable disc comprises:
- (a7) a substrate;
- (b7) a recordable metal layer; and
- (c7) a protective layer.

In particular, the hydrogenated block copolymers of the present invention will be usefully employed in a rewriteable/erasable optical media disc comprising:
- (a8) a first substrate layer
- (b8) a first inorganic layer;
- (c8) a metal alloy layer;
- (d8) a second inorganic layer;
- (e8) a metal layer;
- (f8) a lacquer layer; and
- (g8) optionally, one or more of an optional second metal layer, an optional third and/or fourth inorganic layer, and optional second metal alloy layer, and an optional second substrate layer, wherein at least one of the first substrate layer and the optional second substrate layer comprises a hydrogenated block copolymer of the present invention.

In another specific embodiment, rewriteable/erasable CD formats can also be produced from the hydrogenated block copolymers of the present invention. In one embodiment, a rewriteable/erasable CD comprises:
- (a8') a substrate;
- (b8') a barrier layer;
- (c8') a magneto optical layer or a phase change layer;
- (d8') a barrier layer;
- (e8') a reflective or semi-reflective metal layer;
- (f8') a lacquer.

The substrate comprises the composition of the present invention. The barrier layer is typically a tin nitride for magneto optical or $ZnS$—$SiO_2$ for phase change discs. The magneto optical layer is, for example TbFeCo, while the phase change layer is, for example an alloy of TeGeSb. The reflective or semi-reflective layers are as taught previously and are preferably an aluminum alloy. The lacquer typically comprises a photocurable acrylic as taught previously.

Rewritable and erasable DVD formats include DVD-RAM (Random Access Memory), DVD+RW(Rewriteable) and DVD-R/W(Rewriteable) formats which are all based on phase change technology. Phase change technology uses the difference in reflectivity of the low reflectivity amorphous or high reflectivity crystalline state. The phase change alloy is made of tellurium, germanium and antimony (TeGeSb). The active phase change layer is surrounded by two dielectric films ($ZnS$—$SiO_2$) and covered by an aluminum alloy reflector and protective coating. The difference in reflectivity of the phase change layer is accomplished by heating the layer by laser beam and this becomes the data storage surface.

Additionally, the hydrogenated block copolymers of the present invention can be used to produce a mini-disc. The mini-disc is a 2.5 inch, recordable, erasable, optical disc format, which stores 74 minutes of stereo digital audio. Mini-discs and methods of making are well known to those skilled in the art.

In another embodiment, the hydrogenated block copolymers of the present invention are used to produce digital business cards comprising:
- (a9) a substrate layer,
- (b9) a first metal layer covering at least a portion of the first substrate layer, and
- (c9) a lacquer layer,
  wherein the substrate layer comprises the hydrogenated block copolymers of the present invention. The metal layer and lacquer layer can be substances as taught previously within this specification. These cards are typically the size of a standard business card, having a thickness of approximately 1.2mm and contain 40 to 50 megabytes of information.

In another embodiment, the hydrogenated block copolymers of the present invention are used to produce thin film discs as disclosed in U.S. Pat. Nos. 4,356,066 and 4,880,514, incorporated herein by reference, as well as EP-892,393. U.S. Pat. No. 4,356,066 discloses multi-layer magnetic thin film discs comprising a synthetic resin layer on an aluminum-containing substrate and an overlying metallic magnetic layer. In one embodiment of the present invention a thin film disc is produced comprising,
- (a10) a substrate;
- (b10) a synthetic resin layer;
- (c10) at least one thin metal layer which may also serve as a metallic magnetic layer; and
- (d10) optionally, a metallic magnetic layer, if not included in c9). wherein the substrate or synthetic resin layer comprises a hydrogenated block copolymer of the present invention.

In another aspect, thin film magnetic recording members as disclosed in U.S. Pat. No. 4,880,514, herein incorporated by reference, can also be made from the composition of the present invention. In one embodiment, a thin film magnetic recording member comprises:

(a11) a substrate;
(b11) a metal layer, such as chromium;
(c11) a metal alloy recording layer;
wherein the substrate comprises a hydrogenated block copolymer of the present invention.

In another embodiment, the hydrogenated block copolymers of the present invention are used to produce smart cards as disclosed in U.S. Pat. No. 6,025,054 and U.S. Pat. No. 5,955,021, which are incorporated herein by reference. Smart cards are small cards the size of a conventional credit card containing an IC (integrated circuit) chip and are used as bankcards, ID cards, telephone cards and the like. They are based upon the use of an electromagnetic coupling (either by physical contact or by electromagnetic waves) between the smart card's electronic components and a card reader or other receiving device. Such cards are usually made by assembling several layers of plastic sheets in a sandwich array. Typically, the smart card comprises:

(a12) a first substrate layer;
(b12) a second substrate layer; and
(c12) a center or core layer comprising a thermosetting polymeric material, having an electronic component embedded therein, that is sandwiched between the first and second substrate layers;
wherein all three layers are unified into a body by bonding action between the thermosetting polymeric material used to create the core layer and the materials out of which the first and second substrate layers are made and wherein at least one layer comprises a hydrogenated block copolymer of the present invention. Additionally, the smart card can comprise:
(a13) a substrate layer have an indentation,
(b13) an information-containing microchip retained within the indentation,
wherein the substrate layer comprises a hydrogenated block copolymer of the present invention.

Methods of making optical media discs are well known in the art and described in *The Compact Disc Handbook* $2^{nd}$ Edition by Pohlmann, and referenced in U.S. Pat. No. 4,911,966, as well as in U.S. Pat. No. 5,635,114; U.S. Pat. No. 5,468,324; and U.S. Pat. No. 5,663,016, all of which are herein incorporated by reference.

The high data density optical media disc of the present invention has a retardation of less than 25 nm per 0.6 mm substrate (birefringence of less than 0.000042), and a water absorbance of less than 0.05% as measured according to ASTM D 570. Birefringence Retardation is measured by placing a molded DVD disc substrate between crossed polarizers and quarter wave plates (oriented in opposition). The retardation is measured 20 mm from the injection gate of the disc using light from a 633 nm Laser. Transmitted intensity is measured and the retardation calculated using the following formula:

$$I = I0 \sin 2 ((\pi/\lambda)(\Delta nd))$$

where Retardation=$\Delta$nd
Measured intensity=I
Incident intensity=I0
Wavelength=$\lambda$.

The birefringence is calculated from the measured retardation by dividing retardation by the thickness of the substrate. Preferably the retardation is less than 20 nm, more preferably less than 15 nm and most preferably less than 10 nm in a disc substrate which is 0.6 mm thick. The water absorbance is preferably less than 0.04%, more preferably less than 0.02% and most preferably less than 0.01%.

The following examples are provided to illustrate the present invention. The examples are not intended to limit the scope of the present invention and they should not be so interpreted. Amounts are in weight parts or weight percentages unless otherwise indicated.

EXAMPLES

Hydrogenation of Styrene Butadiene Block Copolymers

Hydrogenation reactions are conducted using a 15% solution (wt/wt) of block copolymer in cyclohexane/isopentane (85/15). Before hydrogenation the solutions are deaerated and passed through an activated alumina column to remove stabilizers and impurities. The hydrogenation is conducted in a high pressure reactor equipped with a gas dispersing agitator. The reactor is loaded with the polymer solution followed by 5% Pt/silica catalyst as described in U.S. Pat. No. 5,612,422. The reactor is sealed, purged with nitrogen and finally pressurized with hydrogen to a pressure of 1200 psig. The reactor is then heated to 170° C. for a period of approximately one hour. The pressure is slowly relieved and the polymer drained from the reactor. 1000 ppm of hindered phenol thermal stabilizer (Irganox™ 1010) is added to the polymer solution. The hydrogenated block copolymer is recovered by devolatilization of the solvents from the polymer solution using heat and vacuum.

The level of hydrogenation of the polystyrene block of all the examples and comparatives is measured at greater than 99% by ultraviolet absorbance.

DVD substrates are injection compression molded from the hydrogenated block copolymer using an injection/compression molding machine with a maximum clamping force 600 kN, maximum injection stroke capability of 100 mm and injection screw diameter of 32 mm. The substrate mold is a DVD single cavity substrate mold. DVD substrates are 120 mm in diameter and 0.6 mm thick. Process temperatures are melt temperatures of 290 to 330° C., mold temperatures of 40 to 80° C. Injection velocity is varied from 25 mm/s to 200 mm/s, increasing as the mold is filled. Once filled, the part is further packed with polymer by applying initial hold pressure of approximately 300 bar which is then reduced to 0 bar over a period of 0.8 sec. The polymer injection shot size is approximately 13.5 mm to achieve a completely full part with an actual part thickness of 0.6 mm. The compression phase is accomplished by applying 55–65% clamp force to the injection mold at the time when approximately 85% of the polymer shot has been injected into the mold cavity. Prior to compression the mold cavity is typically between 1.0 and 1.2 mm thick. The overall cycle time for the process including part removal is 5–10 seconds.

Retardation is measured as described previously. The birefringence is calculated by dividing the measured retardation by the thickness of the substrate. Results are listed in Table I:

TABLE I

| Sample | % PS | % PBd | Mn | % 1,2- | Retardation (nm) |
|---|---|---|---|---|---|
| 1 (tri) | 75% | 25% | 60K | 40% | 11 |
| Comparative Examples: | | | | | |
| 2 (penta) | 75% | 25% | 60K | 8% | 123 |
| 3 (tri) | 75% | 25% | 40K | 8% | 346 |
| 4 (tri) | 75% | 25% | 50K | 8% | 446 |

PS=polystyrene
PBd=polybutadiene
% 1,2=percent of 1,2-content of polybutadiene
penta=Hydrogenated pentablock of styrene and butadiene
tri=Hydrogenated triblock of styrene and butadiene Surprisingly, the low molecular weight polymers of the comparative examples have a higher retardation. One skilled in the art would expect a lower molecular weight copolymer to have higher flow and therefore less material stress during thermoforming, thus a lower retardation and birefringence.

CD Example

A CD substrate is injection molded from the hydrogenated block copolymer of Sample 1, using an injection molding machine with a maximum clamping force 600 kN, maximum injection stroke capability of 100 mm and injection screw diameter of 32 mm. The substrate mold is a CD single cavity substrate mold. A data bearing stamper is inserted into the mold which contains approximately 0.6 Gb of data and a track pitch of approximately 1.6 microns. Process temperatures are melt temperatures of 290 to 330° C., and mold temperatures of 30 to 80° C. Injection velocity is varied from 25 mm/s to 125 mm/s, increasing as the mold is filled. Once filled, the part is further packed with polymer by applying initial hold pressure of approximately 600 bar, which is then reduced to 0 bar over a period of 0.3 sec. The polymer injection shot size is approximately 30 mm to achieve a completely full part with an actual part thickness of 1.2 mm. The overall cycle time for the process including part removal is 3–10 seconds. The CD substrate is 120 mm in diameter and 1.2 mm thick.

The CD substrate is inert gas plasma sputtered to deposit a reflective aluminum layer followed by a UV curable lacquer protective layer.

Similarly, a digital business card is produced using the appropriately shaped data stamper in the mold.

DVD Example

A DVD substrate is injection compression molded from the hydrogenated block copolymer of Sample 1, using an injection/compression molding machine with a maximum clamping force 600 kN, maximum injection stroke capability of 100 mm and injection screw diameter of 32 mm. The substrate mold is a DVD single cavity substrate mold. DVD 5 and 9 optical discs are prepared using data bearing stampers which are inserted into the mold which contain approximately 4.7 Gb of data, and a track pitch of approximately 0.74 microns. Process temperatures are melt temperatures of 290 to 330° C., and mold temperatures of 40 to 80° C. Injection velocity is varied from 25 mm/s to 200 mm/s, increasing as the mold is filled. Once filled, the part is further packed with polymer by applying initial hold pressure of approximately 300 bar which is then reduced to 0 bar over a period of 0.8 sec. The polymer injection shot size is approximately 13.5 mm to achieve a completely full part with an actual part thickness of 0.6 mm. The compression phase is accomplished by applying 55–65% clamp force to the injection mold at the time when approximately 85% of the polymer shot has been injected into the mold cavity. Prior to compression the mold cavity is typically between 1.0 and 1.2 mm thick. The overall cycle time for the process including part removal is 5–10 seconds. The DVD substrates are 120 mm in diameter and 0.6 mm thick.

Once molded, the DVD substrates are sputtered with an aluminum reflective layers. Two individual substrates are bonded together to form a dual layer DVD 9 disc.

Similarly, in order to produce high density pre-recorded DVD formats, stampers are inserted into the mold with track pitch of 0.4 to 0.5 in order to achieve data density of 10 to 20 Gb.

Recordable DVD and CD formats

Recordable versions of both CD and DVD formats are made in similar fashion to the prerecorded formats described above except for the following. The stamper produces a continuous spiral groove of combination of pits and a groove instead of data containing pits. The substrate is then coated with a barrier layer, followed by either a magneto optic layer or a phase change alloy layer. Another barrier layer is applied followed by a reflective layer and finally a protective lacquer layer.

In the case of DVD recordable formats, two data layers are used with a gold semi reflective layer for one data layer and an aluminum reflective layer for the other.

What is claimed is:

1. A composition comprising a hydrogenated block copolymer, wherein the hydrogenated block copolymer comprises at least two distinct blocks of hydrogenated polymerized vinyl aromatic monomer, herein referred to as hydrogenated vinyl aromatic polymer block, and at least one block of hydrogenated polymerized butadiene monomer, herein referred to as hydrogenated butadiene polymer block, wherein the hydrogenated block copolymer is further characterized by:

a) a weight ratio of hydrogenated butadiene polymer block to hydrogenated vinyl aromatic polymer block of 40:60 or less;

b) a total number average molecular weight ($Mn_t$) of from 30,000 to 80,000, wherein each hydrogenated vinyl aromatic polymer block (A) has a $Mn_a$ of from 10,000 to 50,000 and each hydrogenated butadiene polymer block (B) has a $Mn_b$ of from 3,000 to 30,000;

c) a hydrogenation level such that each hydrogenated vinyl aromatic polymer block has a hydrogenation level of greater than 90 percent and each hydrogenated butadiene polymer block has a hydrogenation level of greater than 95 percent; and d) a weight ratio of 1,2 to 1,4 polybutadiene content of greater than 20:80.

2. The composition of claim 1, wherein the vinyl aromatic monomer is styrene.

3. The composition of claim 1, wherein the $Mn_a$ of the hydrogenated vinyl aromatic polymer block is from 12,000 to 45,000.

4. The composition of claim 3, wherein the $Mn_a$ of the hydrogenated vinyl aromatic polymer block is from 15,000 to 30,000.

5. The composition of claim 1, wherein the $Mn_b$ of the hydrogenated butadiene polymer block is from 4,000 to 25,000.

6. The composition of claim 5, wherein the $Mn_b$ of the hydrogenated butadiene polymer block is from 4,000 to 20,000.

7. The composition of claim 1, wherein the weight ratio of 1,2 to 1,4 polybutadiene content is greater than 25:75.

8. The composition of claim 7, wherein the weight ratio of 1,2 to 1,4 polybutadiene content is greater than 30:70.

* * * * *